US010949536B1

United States Patent
Sparks et al.

(10) Patent No.: US 10,949,536 B1
(45) Date of Patent: Mar. 16, 2021

(54) FIELD-LOADABLE INPUT/OUTPUT TABLES FOR AVIONICS HARDWARE UNITS

(71) Applicant: Rockwell Collins, Inc., Cedar Rapids, IA (US)

(72) Inventors: Michael M. Sparks, Alburnett, IA (US); Richard T. Hackett, Viera, FL (US); Victoria C. Wenger, Cedar Rapids, IA (US); Jeffrey E. Fetta, Cedar Rapids, IA (US); Matthew M. Dahm, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 393 days.

(21) Appl. No.: 15/613,883

(22) Filed: Jun. 5, 2017

(51) Int. Cl.
*G06F 21/57* (2013.01)
*G06F 9/54* (2006.01)

(52) U.S. Cl.
CPC .............. *G06F 21/572* (2013.01); *G06F 9/54* (2013.01)

(58) Field of Classification Search
CPC ................................. G06F 21/572; G06F 9/54
USPC ........................................................ 717/124
See application file for complete search history.

(56) References Cited

U.S. PATENT DOCUMENTS

| | | | | |
|---|---|---|---|---|
| 6,694,382 B1* | 2/2004 | Kovalan | ............ | G05B 19/0423 710/33 |
| 7,653,585 B2* | 1/2010 | Guerra | ................... | G06Q 30/08 705/37 |
| 8,359,577 B2* | 1/2013 | Bharadwaj | .......... | G06F 11/3696 714/41 |
| 8,683,105 B1* | 3/2014 | Shultz | .................... | G06F 3/1423 709/230 |
| 2011/0066763 A1* | 3/2011 | Minot | ................. | G06F 9/44505 710/12 |
| 2011/0296379 A1* | 12/2011 | McCready | .............. | G06F 9/541 717/121 |
| 2014/0380433 A1* | 12/2014 | Yerger | .................. | H04L 63/107 726/4 |
| 2015/0100774 A1* | 4/2015 | Lopez | ................. | G06F 9/44505 713/100 |

OTHER PUBLICATIONS

Wilkinson et al., "Recommendations for Future Avionics Hardware Development", SAE, 2001, 21pg. (Year: 2001).*

* cited by examiner

*Primary Examiner* — Ryan D. Coyer
(74) *Attorney, Agent, or Firm* — Suiter Swantz pc llo

(57) ABSTRACT

Embodiments of the inventive concepts disclosed herein are directed to systems and methods for using field-loadable input/output (I/O) tables. An avionics hardware unit may include one or more processors. An operational software of the avionics hardware unit may perform a plurality of operations for processing avionics data in safety or data-integrity driven applications. An I/O table may be loaded onto the avionics hardware. The I/O table may be selected from a plurality of I/O tables loadable onto the avionics hardware for operation with the operational software. The selected I/O table may include a configuration of rules. The rules may be assigned according to the configuration to each of the plurality of operations to configure the behavior of the respective operations for processing the avionics data. The configuration may be different from that of others of the plurality of I/O tables in configuring the plurality of operations of the operational software.

20 Claims, 3 Drawing Sheets

300

302 — Selecting, by an Operational Software Executing on One or More Processors of an Avionics Hardware Unit, an I/O Table from a Plurality of I/O Tables, each I/O Table Comprising a Configuration of Rules, Wherein One or More of the Rules Are Assigned According to the Configuration to Each of the Plurality of Operations to Configure the Behavior of the Respective Operations for Processing the Avionics data, the Configuration of Rules Different from that of Others of the Plurality of I/O Tables in Configuring the Plurality of Operations of the Operational Software

304 — Loading, by the Avionics Hardware Unit, the I/O Table Selected from the Plurality of I/O Tables onto the Avionics Hardware for Operation with the Operational Software

306 — Performing, by the Operational Software of the Avionics Hardware Unit, the Plurality of Operations for Processing the Avionics Data in Accordance with the Loaded I/O Table Selected from the Plurality of I/O Tables

FIG. 3

FIELD-LOADABLE INPUT/OUTPUT TABLES FOR AVIONICS HARDWARE UNITS

BACKGROUND

Avionics software installed onboard an aircraft may be designed in accordance with mandated standards (e.g., Software Considerations in Airborne Systems and Equipment Certification (DO-178C)). The input/output (I/O) information for avionics software for processing data from electronic components may be particular to a specific model, operator, or even registration number of the aircraft. In current systems, any change in the I/O information may cause the avionics software undergo re-certification to conform to the mandated standards. Certification may consume significant computing resources as well as an excessive amount of time and effort.

SUMMARY

In one aspect, embodiments of the inventive concepts disclosed herein are directed to a system for using field-loadable input/output (I/O) tables. I/O information for the operational software may be specified by I/O tables. Each I/O table may specify a set of rules for the operational software in processing data from various sources (e.g., sensors or other avionics hardware units) and relaying the processed data to other components in the aircraft. Segregation of the I/O table from the operational software may allow changes to the I/O table without affecting the core engine of the operational software itself, thereby avoiding re-certification in accordance to mandated standards.

An avionics hardware unit may include one or more processors. An operational software executed on the one or more processors of the avionics hardware unit may perform a plurality of operations for processing avionics data in safety or data-integrity driven applications. An I/O table may be loaded onto the avionics hardware. The I/O table may be selected from a plurality of I/O tables loadable onto the avionics hardware for operation with the operational software. The selected I/O table may include a configuration of rules. One or more of the rules may be assigned according to the configuration to each of the plurality of operations to configure the behavior of the respective operations for processing the avionics data. The configuration of rules may be different from that of others of the plurality of I/O tables in configuring the plurality of operations of the operational software.

In some embodiments, the operational software may validate or determine that the I/O table selected from the plurality of I/O tables conforms to a predefined schema while maintaining certification of the operational software. In some embodiments, the one or more processors may load the I/O table onto the avionics hardware for operation with the operational software responsive to the validation of the I/O table as conforming to the predefined schema.

In some embodiments, the operational software may receive, from one or more sources in communication with the avionics hardware unit, the avionics data. In some embodiments, the operational software may perform a presence-and-validity check on the avionics data. The presence-and-validity check may be specified by the configuration of rules of the I/O table. In some embodiments, the operational software may select at least a portion of the avionics data from at least one of the one or more sources, in accordance with the configuration of rules of the I/O table. In some embodiments, the operational software may unpack the selected at least a portion of the avionics data in accordance with the configuration of rules of the I/O table. In some embodiments, the operational software may apply a filtering algorithm on the unpacked at least a portion of the avionics data in accordance with the configuration of rules of the I/O table.

In some embodiments, the operational software may perform at least two of the operations in a sequence specified according to the configuration of rules of the I/O table. In some embodiments, the operational software may unlink a default I/O table from operating with the operational software, responsive to the selection of the I/O table from the plurality of I/O tables. In some embodiments, the configuration of rules of the selected I/O table may be updated via a user interface subsequent to loading the I/O table into memory of the avionics hardware unit. In some embodiments, the operational software may send a portion of the avionics data processed in accordance with the configuration of rules of the selected I/O table, to a component external to the avionics hardware unit. The external component may include at least one of a second avionics hardware unit, a sensor, or an I/O device.

In a further aspect, embodiments of the inventive concepts disclosed herein are directed to a method of using field-loadable input/output (I/O) tables. An operational software executing on one or more processors of an avionics hardware unit may select an I/O table from a plurality of I/O tables. Each I/O table may include a configuration of rules. One or more of the rules may be assigned according to the configuration to each of a plurality of operations of the operational software for processing avionics data in safety or data-integrity driven applications to configure the behavior of the respective operations for processing the avionics data. The configuration of rules may be different from that of others of the plurality of I/O tables in configuring the plurality of operations of the operational software. The I/O table may be selected from the plurality of I/O tables may be loaded for operation with the operational software. The operational software of the avionics hardware unit may perform the plurality of operations for processing the avionics data, in accordance with the loaded I/O table.

In some embodiments, the operational software may validate that the I/O table selected from the plurality of I/O tables conforms to a predefined schema while maintaining certification of the operational software. In some embodiments, the I/O table onto the avionics hardware for operation with the operational software may be loaded responsive to the validation of the I/O table as conforming to the predefined schema.

In some embodiments, performing the plurality of operations for processing the avionics data may include receiving, from one or more sources in communication with the avionics hardware unit, the avionics data. In some embodiments, performing the plurality of operations for processing the avionics data may include performing a presence-and-validity check on the avionics data, the presence-and-validity check specified by the configuration of rules of the I/O table. In some embodiments, performing the plurality of operations for processing the avionics data may include selecting at least a portion of the avionics data from at least one of the one or more sources, in accordance with the configuration of rules of the I/O table. In some embodiments, performing the plurality of operations for processing the avionics data may include unpacking the selected at least a portion of the avionics data in accordance with the configuration of rules of the I/O table. In some embodiments, performing the plurality of operations for processing the avionics data may include applying a filtering algorithm on the unpacked at least a portion of the avionics data in accordance with the configuration of rules of the I/O table.

In some embodiments, performing the plurality of operations may include performing at least two of the operations in a sequence specified according to the configuration of rules of the I/O table. In some embodiments, loading the I/O table may include unlinking a default I/O table from operating with the operational software, responsive to the selection of the I/O table from the plurality of I/O tables. In some embodiments, the operational software may modify the configuration of rules of the selected I/O table via a user interface subsequent to loading the I/O table into memory of the avionics hardware unit. In some embodiments, the operational software may send a portion of the avionics data processed in accordance with the configuration of rules of the selected I/O table to a component external to the avionics hardware unit. The external component may include at least one of a second avionics hardware unit, a sensor, or an I/O device.

In a further aspect embodiments of the inventive concepts disclosed herein are directed to an avionics hardware unit. The avionics hardware unit may include one or more processors and memory. The avionics hardware unit may include an operational software executed on the one or more processors. The operational software may perform a plurality of operations for processing avionics data in safety or data-integrity driven applications. The avionics hardware unit may an I/O table. The I/O table may be loaded onto the memory. The I/O table may be selected from a plurality of I/O tables loadable onto the memory for operation with the operational software. The selected I/O table may include a configuration of rules. One or more of the rules may be assigned according to the configuration to each of the plurality of operations to configure the behavior of the respective operations for processing the avionics data. The configuration of rules may be different from that of others of the plurality of I/O tables in configuring the plurality of operations of the operational software.

In some embodiments, the operational software may validate that the I/O table selected from the plurality of I/O tables conforms to a predefined schema while maintaining certification of the operational software. In some embodiments, the one or more processors may load the I/O table for operation with the operational software responsive to the validation of the I/O table as conforming to the predefined schema.

In some embodiments, the operational software may receive, from one or more sources in communication with the avionics hardware unit, the avionics data. In some embodiments, the operational software may perform a presence-and-validity check on the avionics data. The presence-and-validity check may be specified by the configuration of rules of the I/O table. In some embodiments, the operational software may select at least a portion of the avionics data from at least one of the one or more sources, in accordance with the configuration of rules of the I/O table. In some embodiments, the operational software may unpack the selected at least a portion of the avionics data in accordance with the configuration of rules of the I/O table. In some embodiments, the operational software may apply a filtering algorithm on the unpacked at least a portion of the avionics data in accordance with the configuration of rules of the I/O table.

In some embodiments, the operational software may perform at least two of the operations in a sequence specified according to the configuration of rules of the I/O table. In some embodiments, the operational software may unlink a default I/O table from operating with the operational software, responsive to the selection of the I/O table from the plurality of I/O tables. In some embodiments, the configuration of rules of the selected I/O table may be updated via a user interface subsequent to loading the I/O table into memory of the avionics hardware unit.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3 shows a block diagram of an example embodiment of a method of using field-loadable input/output (I/O) tables, in accordance with some embodiments of the inventive concepts disclosed herein.

DETAILED DESCRIPTION

Figure 1:
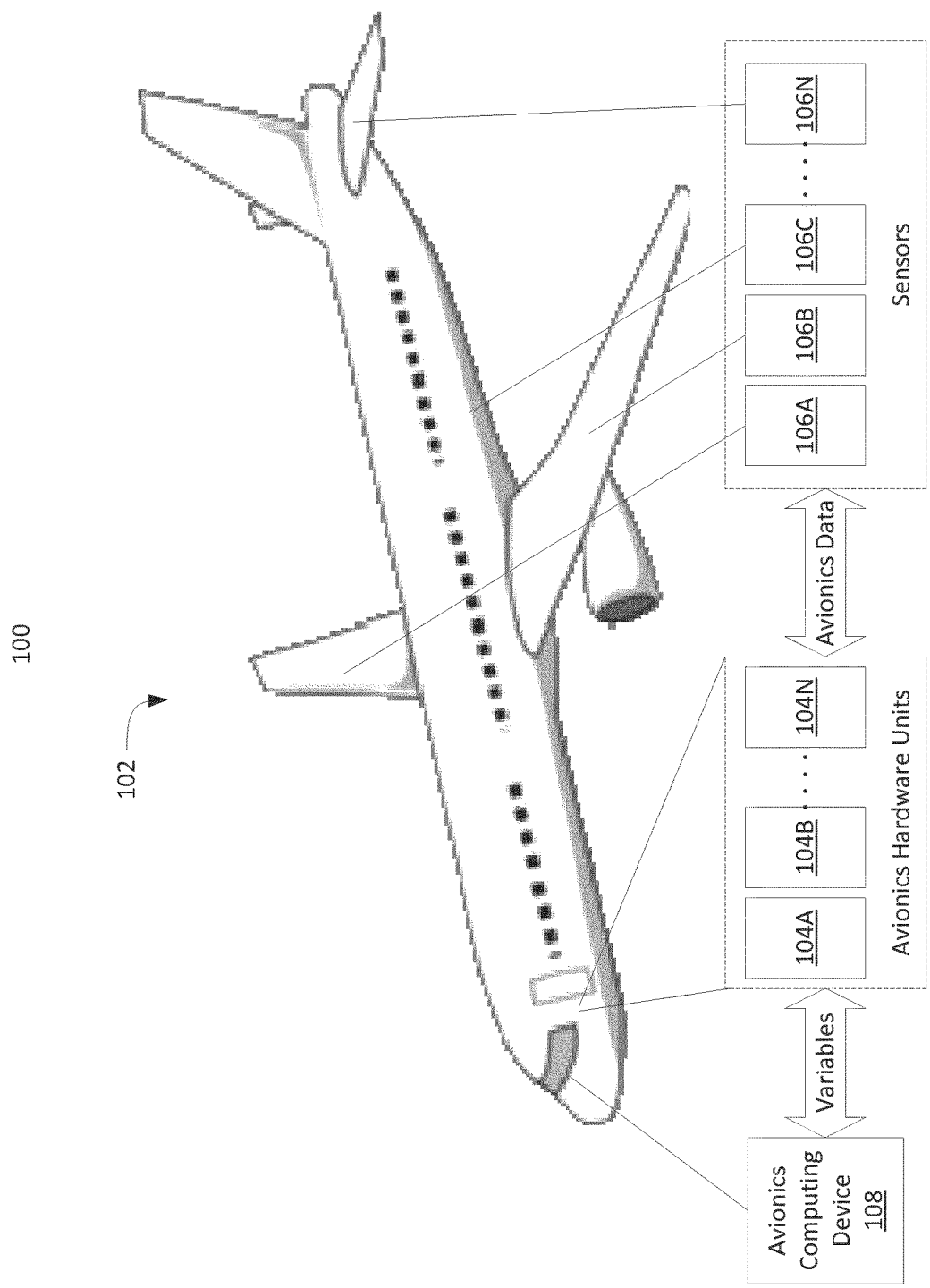
FIG. 1 is a block diagram of an example embodiment of an environment for using field-loadable input/output (I/O) tables, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system, a method, or an apparatus for using input/output (I/O) tables. An operational software may be executed on an avionics hardware unit onboard an aircraft. Using I/O information from or specified by an I/O table, the operational software may receive data from various sources (e.g., sensors or other avionics hardware units), process the received data, and route the processed data to other components located in the aircraft. The behavior of the operational software may be in accordance with mandated standards for safety-critical and/or data-integrity environments. Under such standards, the slightest change to the operational software may result in the operational software having to undergo a certification process. The certification process may include creation of certification documents and of impact analysis documents as well as running of various verification procedures. This process may consume a significant amount of time, effort, and/or processor resources.

By separating the I/O information from the operational software, embodiments of the inventive concepts disclosed herein may allow significant differences in the I/O information or changes to the I/O information to be supported while maintaining the certification of the operational software and conforming to standards in safety-critical and data-integrity driven environments. The I/O information for the operational software may be specified by I/O tables. Each I/O table may specify a set of rules for the operational software in processing data from various sources (e.g., sensors or other avionics hardware units) and relaying the processed data to other components in the aircraft. Each I/O table may also be segregated from the operational software in the memory. The segregation of the I/O table from the operational software may allow changes to the I/O table without affecting the core engine and/or certain basic or fundamental functionalities of the operational software itself, thereby avoiding re-certification in accordance to mandated standards. Upon initiation or even during run-time, the avionics hardware unit may select one of these I/O tables and separately load the selected I/O table for use with the operational software by the avionics hardware unit. In this manner, each time the I/O information is switched, modified or changed, computing resources and time spent in re-certifying the operational software may be avoided.

Referring to FIG. 1, depicted is one embodiment of an environment 100 for using field-loadable input/output (I/O) tables, in accordance with some embodiments of the inventive concepts disclosed herein. In brief summary, the environment 100 may include an aircraft 102. The aircraft 102 may include one or more avionics hardware units 104A-N, one or more sensors 106A-N, and an avionics computing device 108. Each avionics hardware unit 104A-N, sensor 106A-N, and the avionics computing device 108 may be located throughout the aircraft 102 at various respective positions or locations. Each avionics hardware unit 104A-N, sensor 106A-N, and the avionics computing device 108 may be communicatively coupled (with wires or wirelessly) to one another and/or other components (not depicted) of the aircraft 102.

Via the communicative coupling, one or more of the avionics hardware units 104A-N may receive data from the one or more sensors 106A-N and/or the avionics computing device 108. The sensors 106A-N may include one or more of a radar antenna, a fuel gauge, a compass, a gyroscope, an altimeter, a video, a camera (e.g., visual, infrared, or ultraviolet), a microphone, air pressure meter, thermometer, hydraulic pressure sensor, weight sensor, voltmeter, fire detector, air particle detector, barometer, turbine sensors, and instrument landing system, among others for instance. Upon receipt, an operational software executed on the one or more avionics hardware units 104A-N may process the data from the sensors 106A-N in accordance to I/O information. The I/O information may be stored on a memory of each avionics hardware unit 104A-N, and may specify how the operational software may process the data received from the other avionics hardware units 104A-N, sensors 106A-N, and/or the avionics computing device 108 and route the processed data to the other avionics hardware units 104A-N, sensors 106A-N, and/or the avionics computing device 108. The operational software may also convert the processed data to data variables to the avionics computing device 108 in accordance to the I/O information. The data variables may be representations of the data from the sensors 106A-N that may be compatible (e.g., in an expected format) with the avionics computing device 108 for additional processing. As will be explained below, the I/O information may be altered while maintaining the certification of the operational software to comply with standards for safety and/or data-integrity driven applications. The avionics computing device 108 may also perform additional processing on the data variable, and then render and/or display the resultant for the operator of the aircraft 102. The operator of the aircraft 102 may in turn view and/or use the resultant data, such as to manipulate the resultant data using an input/output interface device of the avionics computing device 108.

Figure 2:
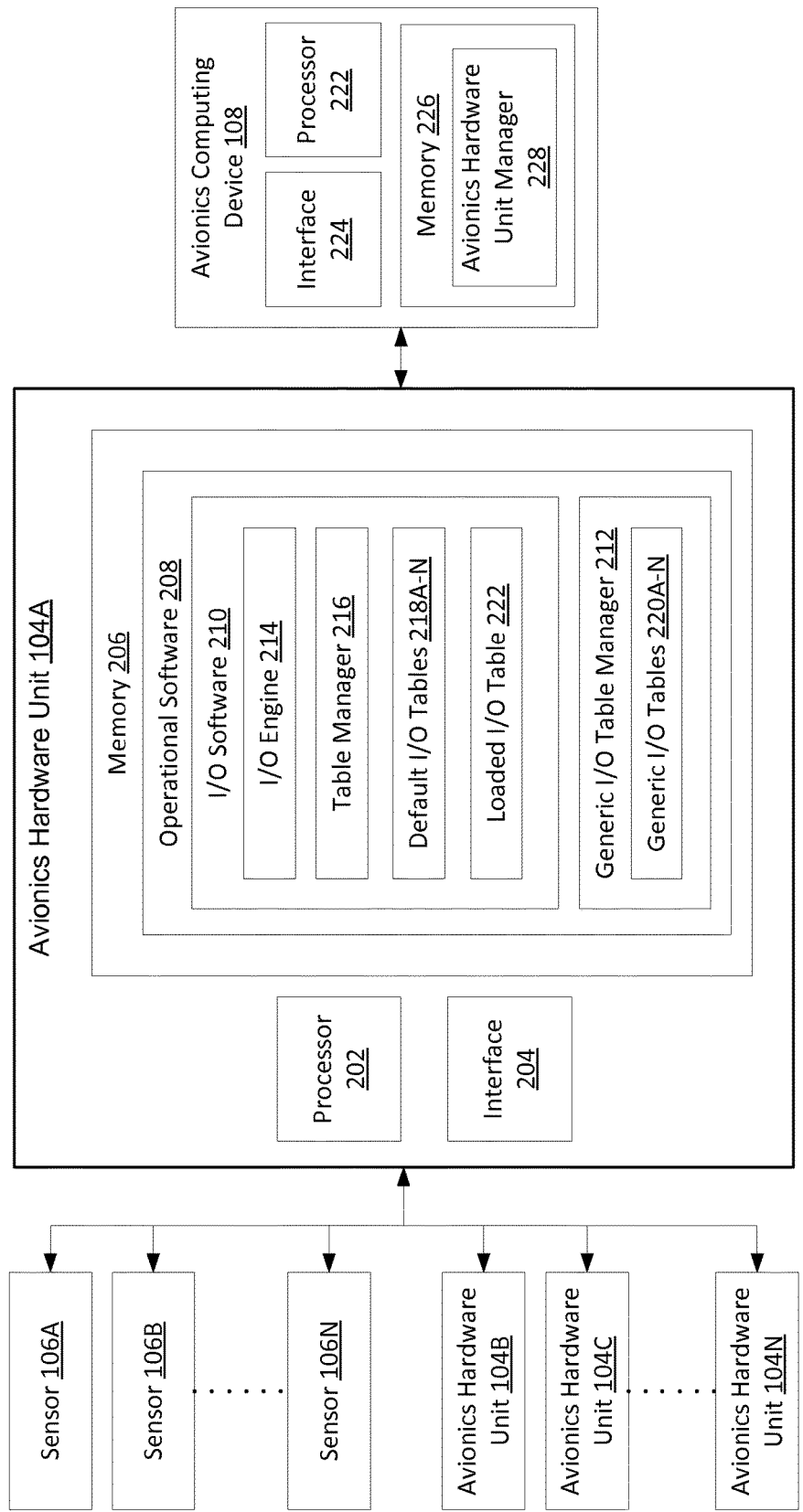
FIG. 2 shows a block diagram of an example embodiment of an architecture for using field-loadable input/output (I/O) tables, in accordance with some embodiments of the inventive concepts disclosed herein.

Referring to FIG. 2, shown is an example system block diagram or architecture 200 for using field-loadable input/output (I/O) tables, in accordance with some embodiments of the inventive concepts disclosed herein. The system or architecture 200 may include the components of the environment 100, such as the one or more avionics hardware units 104A-N, the one or more sensors 106A-N, and the avionics computing device 108 with the functionalities as described above.

Referring now to one of the avionics hardware units 104A-N, the avionics hardware unit 104A includes a processors 202, an interface 204, and/or memory 206. The processor 200 may include a microprocessor unit, an application-specific integrated circuit (ASIC), and/or a field-programmable gate array (FPGA), among others for instance. In some embodiments, the processor 202 may include a multi-core processor or an array of processors. The processor 202 may execute the programmable instructions stored on the memory 206, such as an operational software 208 (sometimes referred to as the "operational program software (OPS)"). The operational software 208 may include an I/O software 210 and a generic I/O table manager 212, among other possible elements. The I/O software 210 may include an I/O engine 214, a table manager 216, one or more default I/O tables 218A-N, and/or a loaded I/O table 222, among other possible elements. The generic I/O table manager 212 may include one or more generic I/O tables 220A-N. The interface 204 may send data processed by the processor 202 to external devices (e.g., sensors 106A-N, the avionics computing device 108, or other avionics hardware units 104B-N) communicatively coupled (with wired connection(s), or wirelessly) to the avionics hardware unit 104A-N. The interface 204 may receive data for processing by the processor 202 from the external devices (e.g., sensors 106A-N, the avionics computing device 108, or other avionics hardware units 104B-N) communicatively coupled (with wired connection(s), or wirelessly) to the avionics hardware unit 104A.

The avionics computing device 108 includes a processor 222, an interface 224, and memory 226. The processor 222 may include a microprocessor unit, an application-specific integrated circuit (ASIC), and/or a field-programmable gate array (FPGA), among other possible elements. In some embodiments, the processor 222 may include a multi-core processor or an array of processors. The processor 222 may execute the programmable instructions stored on the memory 226, such as an avionics hardware unit manager 228. The avionics hardware unit manager 228 may be used to manage, administer, or otherwise control the functionality of the avionic hardware units 104A-N and/or sensors 106A-N. The interface 224 may send data processed by the processor 222 to external devices (e.g., the sensors 106A-N or avionics hardware units 104A-N) communicatively coupled (with wired connection(s), or wirelessly) to the avionics computing device 108. The interface 224 may also receive data for processing by the processor 222 from the external devices (e.g., sensors 106A-N and the avionics computing device 108) communicatively coupled (with wired connection(s), or wirelessly) to the avionics computing device 108. In some embodiments, the interface 224 may be communicatively coupled to one or more input/output devices for managing, administering, or otherwise controlling the functionality of the avionic hardware units 104A-N and/or sensors 106A-N.

Within each avionics hardware unit 104A-N, the operational software 208 (e.g., a copy, installation or instance of the operational software 208) may perform operations for processing data from the one or more sensors 106A-N and/or the avionics computing device 108 in safety and/or data-integrity driven applications. The operational software 208 may also perform operations for relaying or sending the processed data to the one or more sensors 106A-N and/or the avionics computing device 108 in safety and/or data-integrity driven applications. The safety-critical and/or data-integrity driven applications may be in compliance with standards, such as the Development Assurance Level (DAL), Software Considerations in Airborne Systems and Equipment Certification (e.g., DO-178B, RTCA/DO-178B, and ED-12B, DO-178C, DO-178C/ED-12C), Guidelines and Methods for Conducting the Safety Assessment Process on Civil Airborne Systems and Equipment (e.g., ARP4754, ARP4761), and IEEE Standard for Software Safety Plans (e.g., STD-1228-1994), among others. The operational software 208 may have been verified and/or validated in accordance with the standards for safety-critical and/or data-integrity driven applications. The verification and/or validation of the operational software 208 may include certification and/or change impact analysis. In verifying and/or validating the operational software 208, certification and/or change impact analysis documents may be generated.

The specific and/or customized performance of the operations for processing the avionics data by the operational software 208 may be in accordance to the loaded I/O table 222. For instance, each of the operations may be specified or customized in accordance to the loaded I/O table 222. In some scenarios or cases, the loaded I/O table 222 may be selected from the one of the generic I/O tables 220A-N and the default I/O tables 218A-N. Each I/O table 220A-N and 218A-N may be sourced from interface control documentation, and may contain information for: connections with external components (e.g., other avionics hardware units 104B-N, the sensors 106A-N, and the avionics computing device 108 via the interface 204); data translation and/or normalization, parameter decoding, parameter ranges, parameter scaling, and filtering algorithms for data received at the avionics hardware unit 104A; and source selection options of the external components connected to the avionics hardware unit 104A. Each I/O table 220A-N and 218A-N may be a data structure (e.g., array, matrix, tree, heap, hash table, etc.) stored on memory 206 of the avionics hardware unit 104A.

Each I/O table 220A-N and 218A-N may include a configuration of rules. Each configuration may specify the behavior of the operations of the operational software 208 in processing the avionics data from the one or more sensors 106A-N, the other avionics hardware units 104B-N, and/or the avionics computing device 108. In addition, each configuration may specify the behavior of the operations of the operational software 208 in relaying the processed avionics data to the one or more sensors 106A-N, the other avionics hardware units 104B-N, and/or the avionics computing device 108. Each rule may be assigned according to the configuration of each operation to configure the behavior of the respective operations for processing the avionics data.

Each I/O table 220A-N and 218A-N may specify a different configuration of rules. In some embodiments, each configuration of rules may differ from other configuration of rules (e.g., from other available I/O tables, or from other versions of an I/O table) in configuring the operations of the operational software 208. In some embodiments, the configuration of rules in different I/O tables 220A-N and 218A-N may specify different port mappings. In some embodiments, the configuration of rules in different I/O tables 220A-N and 218A-N may specify different operations. In some embodiments, the configuration of rules in different I/O tables 220A-N and 218A-N may support different number of sources (e.g., of data). For example, one configuration of one I/O table 220A-N and 218A-N may specify a port mapping adding data from a first sensor 106A to data from a second sensor 106B, calculating a rolling mean, and then normalizing the summed data by the rolling mean. In contrast, another configuration of rules in another I/O table 220A-N and 218A-N may specify subtraction of data from a first sensor 106A with data from a second sensor 106B and from a third sensor 106C, determination of a variance of the subtracted data over pre-determined time window, and running the difference through a low-pass filter using pre-defined parameters for the filter responsive to determining that the variance is greater than a particular threshold.

In some embodiments, the configuration of rules in different I/O tables 220A-N and 218A-N may specify different I/O processing rates. For example, one configuration of rules in one I/O table 220A-N and 218A-N may specify a processing rate of 2.4 Hz, whereas another configuration of rules in another I/O table 220A-N and 218A-N may specify a processing rate of 4 Hz. In some embodiments, the configuration of rules in different I/O tables 220A-N and 218A-N may specify whether the operational software 208 is to process and/or output analog data or digital data (e.g., through the use of analog-to-digital or digital-to-analog converters in the hardware unit). In some embodiments, the configuration of rules in different I/O tables 220A-N and 218A-N may specify a sampling rate for analog data using an analog-to-digital converter. In some embodiments, the configuration of rules in different I/O tables 220A-N and 218A-N may specify the use or configuration of different interface-defined busses (e.g., control bus, address bus, or data bus). In some embodiments, the configuration of rules in different I/O tables 220A-N and 218A-N may specify different address data such as memory addresses or device addresses (e.g., to access data or send data). In some embodiments, the configuration of rules in different I/O tables 220A-N and 218A-N may specify different data feed definitions for various sources and/or destinations (e.g., remote data concentrators). In some embodiments, the configuration of rules in different I/O tables 220A-N and 218A-N may correspond to different specific models, operators, or even registration numbers of aircraft 102 or aircraft components. In some embodiments, the configuration of rules in different I/O tables 220A-N and 218A-N may support different functional options and/or display features (e.g., of large format display systems).

The operations specified by the rules in each I/O table 218A-N and 220A-N may be sequential and/or hierarchical. The rules of each I/O table 218A-N and 220A-N may be predefined by an administrator of the avionics hardware unit 104A (e.g., via the avionics computing device 108). Whether the rules in each I/O table 218A-N and 220A-N are to be executed sequentially or hierarchically may be defined by a data structure representing the I/O table 218A-N and 220A-N. In some embodiments, a subset of the operations may be specified by the rules in each I/O table 218A-N and 220A-N as to be performed sequentially. For instance, a first subset of the rules may indicate how two or more operations (e.g., data scaling and filtering) are to proceed in a particular sequence or in parallel relative to each other, while other rules may dictate, specify or provide customization on how each of the respective operations should proceed within that operation (e.g., the specific execution pathway for various steps within an operation). An operation may include a number of possible steps for configuration, execution and completion, provides a number of possible pathways for proceeding with that operation.

The rules may specify or define a certain pathway, e.g., which of the possible steps to actually execute, how these should be configured, the sequence or dependencies of these steps, and any other requirements (e.g., service level, encryption level, compression level). One subset of the operations may be specified by the rules in each I/O table 218A-N and 220A-N to be performed hierarchically. For instance and in some embodiments, the rules of the I/O table 218A-N and 220A-N may define a pathway logic for operations designated as hierarchical. The pathway logic may specify a conditional prerequisite for one operation subsequent to performing another operation. For instance, one operation may be specified as to be performed responsive to a positive result in another operation. In some embodiments, the rules of the I/O table 218A-N and 220A-N may specify or define a port mapping of I/O ports at the interface 204 for processing by the operational software 208. For instance, the port mapping of one I/O table used in a hardware unit, as compared to the port mapping of another I/O table for use in the same hardware unit, may be different according to the rules in each I/O table, so as to allow the same hardware unit to interface with and port data to/from different types of external devices and/or data sources/sinks, according to each of the I/O tables.

The default I/O tables 218A-N and the generic tables 220A-N may differ in transferability and reusability among various avionics hardware units 104A-N. The default I/O tables 218A-N may be specific to the avionics hardware unit 104A-N, operational software 208 (or its various versions), and/or aircraft 102. In contrast, the generic tables 220A-N may be modular, reusable across avionics hardware units, and/or support various protocols. The generic tables 220A-N may be loaded for use for operation among various avionics hardware units 104A-N, operational software 208 (or its various versions), and/or aircraft 102. The generic I/O table manager 212 may generate and manage the generic tables 220A-N stored on memory 206 of the avionics hardware unit 104A. In some embodiments, the default I/O tables 218A-N and the generic tables 220A-N may be allocated to different memory addresses on the memory 206.

Each of the default I/O tables 218A-N and the generic I/O tables 220A-N may be loadable onto the avionics hardware unit 104A for operation with the operational software 208. One of the default I/O tables 218A-N or the generic I/O tables 220A-N may be selected as the I/O table 222 loaded onto the avionics hardware 104A for operation with the operational software 208 (e.g., during initialization of the system 200 or in the absence of another I/O table or one specified to use). In some embodiments, the I/O table 222 may be loaded by allocation statically or dynamically to a section of memory. In some embodiments, the avionics hardware unit 104A may select one of the default I/O tables 218A-N or the generic I/O tables 220A-N and may load the selected I/O table 218A-N and 220A-N as the loaded I/O table 222, independently of (or separately from) loading the operational software 208 (e.g., to different memory locations and/or segments). The loading of the I/O table 222 by the avionics hardware unit 104A may be done prior to or concurrently with the initiation of the execution of the operational software 208. In some embodiments, subsequent to the initiation of the execution of the operational software 208, the table manager 216 may select one of the default I/O tables 218A-N or the generic I/O tables 220A-N and may load the selected I/O table 218A-N and 220A-N as the loaded I/O table 222.

Upon loading one of the generic I/O tables 220A-N and the default I/O tables 218A-N as the I/O table 222, the table manager 216 of the operational software 208 may validate the loaded I/O table 222. The validation of the I/O table 222 may be separate and/or individual to the initialization of the operational software 208, and therefore may be done while maintaining certification of the operational software 208. In this manner, the architecture 200 may change the I/O information used by the operational software 208, without the operational software 208 undergoing underlying changes and recertification in accordance to standards for safety-critical or data-integrity driven applications.

To validate the loaded I/O table, the table manager 216 may determine whether the I/O table 218A-N and 220A-N conforms to a predefined schema. The predefined schema may define the system configuration and/or requirements of the operational software 208 and/or the avionics hardware unit 104A for operation with the I/O table 222. In some embodiments, the predefined schema may specify a number of external components (e.g., other avionics hardware units 104B-N, sensors 106A-N, and/or the avionics computing device 108) connected to the avionics hardware unit 104). In some embodiments, the predefined schema may specify types of external components (e.g., a type of avionics hardware unit 104B-N, a type of sensor 106A-N, and/or a type of avionics computing device 108) connected to the avionics hardware unit 104). In some embodiments, the predefined schema may specify type(s) of hardware components within the avionics hardware unit 104A (e.g., processor 202, interface 204, external components connected to the interface 204, and the memory 206). In some embodiments, the predefined schema may specify a version, a type, or otherwise an identifier for the operational software 208. In some embodiments, the predefined schema may specify interface location pins and/or an option selection file, among other specifications and/or requirements. In some embodiments, at least one of the default I/O tables 218A-N may conform to the predefined schema. If the table manager 216 determines that the generic I/O table 220A-N does not conform to the predefined schema, the table manager 216 may identify a next generic I/O table 220A-N and repeat the validation process with the next identified generic I/O table 220A-N. If none of the generic tables 220A-N conforms to the predefined schema, the table manager 216 may load one of the default I/O tables 218A-N as the loaded I/O table 222.

If the table manager 216 determines that the generic I/O table 220A-N conforms to the predefined schema, the table manager 216 may select I/O table 218A-N and/or 220A-N and load the selected I/O table 218A-N and 220A-N onto the avionics hardware unit 104A for operation with the operational software 208. In some embodiments, neither the default I/O tables 218A-N nor the generic I/O tables 220A-N may be loaded initially. The table manager 216 may select from one of the I/O tables 218A-N and/or 220A-N to load and use as the loaded I/O table 222, e.g., subject to validation. In some embodiments, one of the default I/O tables 218A-N may be pre-loaded onto the avionics hardware unit 104A for operation with the operational software 208. The table manager 216 may select one of the generic I/O tables 220A-N as the loaded table 222, responsive to determining that the generic I/O table 220A-N conforms to the pre-defined schema. Once one of the generic I/O tables 220A-N is selected as the loaded table 222, the table manager 216 may unlink the default I/O table 218A-N from operation with the operational software 208. In loading one of the I/O table 218A-N and/or 220A-N, the table manager 216 may move a pointer or a memory reference of the loaded table 222 to the selected I/O table 218A-N and/or 220A-N.

Subsequent to loading the I/O table 222 and to the initiation of the operational software 208, the table manager 216 may load another (or replace the I/O table 222 with) I/O table 218A-N and/or 220A-N and repeat the validation process for the other I/O table 218A-N and/or 220A-N described above. In some embodiments, the loading of the other I/O table 218A-N and/or 220A-N may be during flight-time of the aircraft 102. In some embodiments, the loading of the other I/O table 218A-N and/or 220A-N may be during run-time of the operational software 208. As the I/O tables 220A-N may be loaded separate and individually from the operational software 208, the re-certification of the operational software 208 may be avoided. In loading one of the I/O table 218A-N and/or 220A-N, the table manager 216 may move a pointer or a memory reference of the loaded table 222 from the initially selected I/O table 218A-N and/or 220A-N to the new I/O table 218A-N and/or 220A-N. In some embodiments, the initially loaded I/O table 222 may be one of the default I/O tables 218A-N and the subsequent loaded I/O table 222 may be one of the generic I/O tables 220A-N or other available I/O tables. In some embodiments, the initially loaded I/O table 222 may be one of the generic I/O tables 220A-N and the subsequently loaded I/O table 222 may be one of the default I/O tables 218A-N.

In some embodiments, subsequent to loading the I/O table 222 and to the initiation of the operational software 208, the table manager 216 may modify the configuration of rules of the loaded I/O table 222. The modification to the configuration of rules may include changes to the behavior of the operations of the operational software 208 in processing the avionics data from the one or more sensors 106A-N, the other avionics hardware units 104B-N, and/or the avionics computing device 108. In addition, the modification to the configuration of rules may include changes to the behavior of the operations of the operational software 208 in relaying the processed avionics data to the one or more sensors 106A-N, the other avionics hardware units 104B-N, and the avionics computing device 108. In some embodiments, the modification to the configuration of rules of the loaded I/O table 222 may be done via a user interface communicatively coupled to the interface 204 of the avionics hardware unit 104. In some embodiments, the modification to the configuration of rules of the loaded I/O table 222 may be done via the input/output device (e.g., a keyboard, buttons, a mouse) communicatively coupled to the interface 224 of the avionics computing device 108. The interface 224 of the avionics computing device 108 may be in turn communicatively coupled to the interface 204 of the avionics hardware unit 104A.

With the loaded I/O table 222 selected from the generic I/O tables 220A-N and/or the default I/O tables 218A-N, the I/O engine 214 of the operational software 208 may perform the operations specified by the configuration of rules of the loaded table 222 in processing data from the external components and relaying the processed data to the external components (e.g., other avionics hardware units 104B-N, sensors 106B-N, and/or the avionics computing device 108). In some embodiments, the I/O engine 214 may perform at least two of the operations in a sequence and/or in parallel specified in accordance with the configuration of rules of the loaded I/O table 222. In some embodiments, the I/O engine 214 may assign one operation to one processor (e.g., of the hardware unit) and another operation to another processor to perform the operations in parallel as specified by the configuration of rules of the loaded I/O table 222.

In accordance to the configuration of rules of the loaded table 222, the I/O engine 214 may receive data from one or more sources (e.g., other avionics hardware units 104B-N, sensors 106B-N, and/or the avionics computing device 108) communicatively coupled to the avionics hardware unit 104A via the interface 204. Once received, the I/O engine 214 may perform a presence-and-validity check on the data from the one or more sources. The presence-and-validity check may be specified by the configuration of rules of the loaded I/O table 222. The presence-and-validity check may include various data validation processes, such as a batch totals check, a cardinality check, consistency check, control totals, a range check, a file existence check, a data type check, a logic check, a referential integrity check, and permitted characters check, among other possible checks. The presence-and-validity check may be used by the I/O engine 214 to verify the data integrity of the received data. To perform the presence-and-validity check, the I/O engine 214 may perform a parity bit check on the data from the one or more sources. In some embodiments, the I/O engine 214 may determine an existence or presence of parameters (e.g., certain predefined types of parameters and/or a predefined minimal number of parameters) in the data received from the one or more sources.

Pursuant to the configuration of rules defined in the loaded I/O table 222, the I/O engine 214 may select at least a portion of the data available or received from at least one of the one or more sources, e.g., for processing in accordance with the loaded I/O table 222. In some embodiments, the portion of data may be selected based on the sources specified by the configuration of rules of the loaded I/O table 222. In some embodiments, the portion of data may be selected based on type of data specified by the configuration of rules of the loaded I/O table 222. In some embodiments, the portion of data may be selected based on a time schedule specified by the loaded I/O table 222. In some embodiments, the portion of data may be selected based on a deterministic logic defined by the loaded I/O table 222. In some embodiments, the portion of data may be selected based on phase, stage and/or sequence of processing specified by the loaded I/O table 222.

Responsive to selection of at least the portion of data, the I/O engine 214 may unpack the selected portion of data in accordance to the loaded I/O table 222. In some embodiments, the I/O engine 214 may apply a de-compression, interpretation, or mapping algorithm specified by the configuration of the rules of the loaded I/O table 222. In some embodiments, the I/O engine 214 may convert parameters of the selected portion of data to engineering units specified by the configuration of rules. In some embodiments, the I/O engine 214 may normalize status enumerations or other information of the selected portion of data in accordance with the configuration of rules of the loaded I/O table 222. In some embodiments, the I/O engine 214 may apply a filtering algorithm to the unpacked and selected portion of data in accordance with the configuration of rules of the I/O table 222. In some embodiments, the filtering algorithm may be one of Butterworth filter, Bessel filter, Elliptic filter, and Kalman filter, among others. The configuration of rules of the loaded I/O table 222 may specify whether the filtering algorithm is one of a low-pass, high-pass, or band-pass filter, among other possible filters, and may specify cut-off frequencies. Once the data received is processed, the I/O engine 214 may relay or send the selected portion of the data in accordance with the configuration rules of the loaded I/O table 222 to one or more of the external components (e.g., other avionics hardware units 104B-N, sensors 106B-N, and/or the avionics computing device 108) via the interface 204.

Referring to FIG. 3, illustrated is a method 300 of using field-loadable input/output (I/O) tables in accordance with some embodiments of the inventive concepts disclosed herein. The functionalities of method 300 may be implemented by any of the computing devices and system architectures depicted in FIGS. 1 and 2. In brief summary, an operational software executing on one or more processors of an avionics hardware unit may select, or be used to select and/or operate with an I/O table from a plurality of I/O tables. Each I/O table may include a configuration of rules (302). One or more of the rules may be assigned according to the configuration to each of a plurality of operations of the operational software for processing avionics data in safety and/or data-integrity driven applications to configure the behavior of the respective operations for processing the avionics data. The configuration of rules may be different from that of others of the plurality of I/O tables in configuring the plurality of operations of the operational software. The I/O table selected from the plurality of I/O tables may be loaded for operation with the operational software (304). The operational software of the avionics hardware unit may perform the plurality of operations for processing the avionics data, in accordance with the loaded I/O table (306).

In further detail, referring now to step 302, and in some embodiments, an operational software executing on one or more processors of an avionics hardware unit may select an I/O table from a plurality of I/O tables. Each I/O table may include a configuration of rules. One or more of the rules may be assigned according to the configuration to each of a plurality of operations of the operational software for processing avionics data in safety and/or data-integrity driven applications to configure the behavior of the respective operations for processing the avionics data. The configuration of rules may be different from that of others of the plurality of I/O tables in configuring the plurality of operations of the operational software. Each configuration may specify the behavior and/or execution pathway(s) of the operations of the operational software in processing the avionics data from the one or more sensors, the other avionics hardware units, and/or the avionics computing device. In addition, each configuration may specify the behavior of the operations of the operational software in relaying the processed avionics data to the one or more sensors, the other avionics hardware units, and/or the avionics computing device. In some embodiments, the plurality of I/O tables may include a set of default I/O tables included with the operational software and/or a set of generic I/O tables. The default I/O tables may be specific to the avionics hardware unit, operational software (or its various versions), and/or aircraft. In contrast, the generic tables may be modular, reusable across hardware units and/or support various protocols.

Referring now to step 304, and in some embodiments, the I/O table selected from the plurality of I/O tables may be loaded for operation with the operational software. In some embodiments, the avionics hardware running the operational software may load the selected I/O table for the operational software. In some embodiments, responsive to the selection of the I/O table, the operational software may load the selected I/O table for the operational software. In some embodiments, the operational software may validate the selected I/O table for operation with the operational software by determining whether the selected I/O table conforms to a predefined schema. The predefined schema may define the system configuration and requirements of the operational software and/or the avionics hardware unit for operation with the I/O table. In some embodiments, in loading the selected I/O table, the operational software may change a pointer or a memory reference from a previously loaded I/O table (e.g., one of the default I/O tables) to the selected I/O tables.

Referring now to step 306, and in some embodiments, the operational software of the avionics hardware unit may perform the plurality of operations for processing the avionics data, in accordance with the loaded I/O table. In accordance to the configuration of rules of the loaded table, the operational software may receive data from one or more sources (e.g., other avionics hardware units, sensors, and/or the avionics computing device) communicatively coupled to the avionics hardware unit via the interface. Once received, the operational software may perform a presence-and-validity check on the data from the one or more sources. The presence-and-validity check may be specified by the configuration of rules of the loaded I/O table. The presence-and-validity check may include various data validation processes. Pursuant to the configuration of rules defined in the loaded I/O table, the operational software may select at least a portion of the data received from at least one of the one or more sources, e.g., for processing or use by a certain operation of the plurality of operations. In some embodiments, the portion of data may be selected based on the sources specified by the configuration of rules of the loaded I/O table, e.g., for a particular operation. Responsive to selection of at least the portion of data, the operational software may unpack the selected portion of data in accordance to the loaded I/O table. In some embodiments, the operational software may apply a filtering algorithm to the unpacked and selected portion of data in accordance with the configuration of rules of the I/O table. Once the data received is processed, the operational software may relay or send the selected portion of the data in accordance with the configuration rules of the loaded I/O table to one or more of the external components (e.g., other avionics hardware units, sensors, and/or the avionics computing device) via the interface.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for using field-loadable input/output (I/O) tables, comprising:
   an avionics hardware unit comprising one or more processors;
   an operational software executed on the one or more processors of the avionics hardware unit, configured to perform a plurality of operations for processing avionics data in safety or data-integrity driven applications; and
   a first I/O table loaded onto the avionics hardware to replace a pre-loaded second I/O table, while maintaining certification of the operation software in accordance with the safety or data-integrity driven applications, the first I/O table selected from a plurality of I/O tables loadable onto the avionics hardware for operation with the operational software, the selected first I/O table comprising a configuration of rules, wherein one or more of the rules are assigned according to the configuration to each of the plurality of operations to configure the behavior of the respective operations for processing the avionics data, the configuration of rules different from that of others of the plurality of I/O tables in configuring the plurality of operations of the operational software.

2. The system of claim 1, wherein the operational software is further configured to validate that the first I/O table selected from the plurality of I/O tables conforms to a predefined schema while maintaining the certification of the operational software; and
   wherein the one or more processors are configured to load the first I/O table onto the avionics hardware for operation with the operational software responsive to the validation of the I/O table as conforming to the predefined schema.

3. The system of claim 1, wherein the operational software is further configured to:
   receive, from one or more sources in communication with the avionics hardware unit, the avionics data;
   perform a presence-and-validity check on the avionics data, the presence-and-validity check specified by the configuration of rules of the first I/O table;
   select at least a portion of the avionics data from at least one of the one or more sources, in accordance with the configuration of rules of the first I/O table;
   unpack the selected at least a portion of the avionics data in accordance with the configuration of rules of the first I/O table; and
   apply a filtering algorithm on the unpacked at least a portion of the avionics data in accordance with the configuration of rules of the first I/O table.

4. The system of claim 1, wherein the operational software is further configured to perform at least two of the operations in a sequence specified according to the configuration of rules of the first I/O table.

5. The system of claim 1, wherein the operational software is further configured to unlink a default I/O table from operating with the operational software, responsive to the selection of the first I/O table from the plurality of I/O tables.

6. The system of claim 1, wherein the configuration of rules of the selected first I/O table is updated via a user interface subsequent to loading the first I/O table into memory of the avionics hardware unit.

7. The system of claim 1, wherein the operational software is further configured to send a portion of the avionics data processed in accordance with the configuration of rules of the selected first I/O table, to a component external to the avionics hardware unit, the external component including at least one of a second avionics hardware unit, a sensor, or an I/O device.

8. A method for using field-loadable input/output (I/O) tables, comprising:
   selecting, by an operational software executing on one or more processors of an avionics hardware unit, a first I/O table from a plurality of I/O tables, each I/O table comprising a configuration of rules, wherein one or more of the rules are assigned according to the configuration to each of a plurality of operations of the operational software for processing avionics data in safety or data-integrity driven applications, to configure the behavior of the respective operations for processing the avionics data, the configuration of rules different from that of others of the plurality of I/O tables in configuring the plurality of operations of the operational software;
   loading the first I/O table selected from the plurality of I/O tables to replace a pre-loaded second I/O table, for operation with the operational software while maintaining certification of the operation software in accordance with the safety or data-integrity driven applications; and performing, by the operational software of the avionics hardware unit, the plurality of operations for processing the avionics data, in accordance with the loaded first I/O table.

9. The method of claim 8, further comprising:
validating, by the operational software, that the first I/O table selected from the plurality of I/O tables conforms to a predefined schema while maintaining the certification of the operational software; and
wherein loading the I/O table further comprises loading the first I/O table onto the avionics hardware for operation with the operational software responsive to the validation of the first I/O table as conforming to the predefined schema.

10. The method of claim 8, wherein performing the plurality of operations for processing the avionics data further comprises:
receiving, by the operational software, from one or more sources in communication with the avionics hardware unit, the avionics data;
performing, by the operational software, a presence-and-validity check on the avionics data, the presence-and-validity check specified by the configuration of rules of the first I/O table;
selecting, by the operational software, at least a portion of the avionics data from at least one of the one or more sources, in accordance with the configuration of rules of the first I/O table;
unpacking, by the operational software, the selected at least a portion of the avionics data in accordance with the configuration of rules of the first I/O table; and
applying, by the operational software, a filtering algorithm on the unpacked at least a portion of the avionics data in accordance with the configuration of rules of the first I/O table.

11. The method of claim 8, wherein performing the plurality of operations further comprises performing at least two of the operations in a sequence specified according to the configuration of rules of the first I/O table.

12. The method of claim 8, wherein loading the first I/O table further comprises unlinking a default I/O table from operating with the operational software, responsive to the selection of the first I/O table from the plurality of I/O tables.

13. The method of claim 8, further comprising:
modifying, by the operational software, the configuration of rules of the selected first I/O table via a user interface subsequent to loading the first I/O table into memory of the avionics hardware unit.

14. The method of claim 8, further comprising:
sending, by the operational software, a portion of the avionics data processed in accordance with the configuration of rules of the selected first I/O table, to a component external to the avionics hardware unit, the external component including at least one of a second avionics hardware unit, a sensor, or an I/O device.

15. An avionics hardware unit, comprising:
one or more processors and memory;
an operational software executed on the one or more processors, configured to perform a plurality of operations for processing avionics data in safety or data-integrity driven applications; and
a first I/O table loaded onto the memory to replace a pre-loaded second I/O table, while maintaining certification of the operational software in accordance with the safety or data-integrity driven applications, the first I/O table selected from a plurality of I/O tables loadable onto the memory for operation with the operational software, the selected first I/O table comprising a configuration of rules, wherein one or more of the rules are assigned according to the configuration to each of the plurality of operations to configure the behavior of the respective operations for processing the avionics data, the configuration of rules different from that of others of the plurality of I/O tables in configuring the plurality of operations of the operational software.

16. The avionics hardware unit of claim 15, wherein the operational software is further configured to validate that the first I/O table selected from the plurality of I/O tables conforms to a predefined schema while maintaining certification of the operational software; and
wherein the one or more processors are configured to load the first I/O table for operation with the operational software responsive to the validation of the first I/O table as conforming to the predefined schema.

17. The avionics hardware unit of claim 15, wherein the operational software is further configured to:
receive, from one or more sources in communication with the avionics hardware unit, the avionics data;
perform a presence-and-validity check on the avionics data, the presence-and-validity check specified by the configuration of rules of the first I/O table;
select at least a portion of the avionics data from at least one of the one or more sources, in accordance with the configuration of rules of the first I/O table;
unpack the selected at least a portion of the avionics data in accordance with the configuration of rules of the first I/O table; and
apply a filtering algorithm on the unpacked at least a portion of the avionics data in accordance with the configuration of rules of the first I/O table.

18. The avionics hardware unit of claim 15, wherein the operational software is further configured to perform at least two of the operations in a sequence specified according to the configuration of rules of the first I/O table.

19. The avionics hardware unit of claim 15, wherein the operational software is further configured to unlink a default I/O table from operating with the operational software, responsive to the selection of the first I/O table from the plurality of I/O tables.

20. The avionics hardware unit of claim 15, the configuration of rules of the selected first I/O table is updated via a user interface subsequent to loading the first I/O table into memory of the avionics hardware unit.

* * * * *